United States Patent
Lee

(10) Patent No.: US 6,715,032 B1
(45) Date of Patent: Mar. 30, 2004

(54) HARD DISK ONTO WHICH TABLE INFORMATION DEPENDING ON MODEL IS WRITTEN, AND HARD DISK DRIVE ADOPTING SUCH A DISK

(75) Inventor: Seong-no Lee, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/223,720

(22) Filed: Dec. 31, 1998

(30) Foreign Application Priority Data

Dec. 31, 1997 (KR) .............................. 97-82026

(51) Int. Cl.[7] .............................................. G06F 12/00
(52) U.S. Cl. ........................ 711/112; 711/4; 360/97.01
(58) Field of Search ................................ 711/112, 206, 711/11, 4; 350/4; 361/685; 360/78.08, 97.01; 386/70; 365/230.03; 713/192

(56) References Cited

U.S. PATENT DOCUMENTS

| | | | |
|---|---|---|---|
| 4,639,863 A | * | 1/1987 | Harrison et al. ............. 361/685 |
| 5,012,514 A | * | 4/1991 | Renton ........................... 380/4 |
| 5,283,790 A | * | 2/1994 | Kawashita ................... 711/112 |
| 5,379,439 A | * | 1/1995 | Harrison et al. ............ 360/72.1 |
| 5,617,385 A | | 4/1997 | Lee et al. |
| 5,668,970 A | * | 9/1997 | Cowart et al. ............... 711/206 |
| 5,687,160 A | | 11/1997 | Aotake et al. |
| 5,708,650 A | | 1/1998 | Nakashima et al. |
| 5,719,983 A | * | 2/1998 | Henderson et al. ........... 386/70 |
| 5,721,724 A | | 2/1998 | Taira et al. |
| 5,754,521 A | | 5/1998 | Yokota |
| 5,761,189 A | | 6/1998 | Yamamuro |
| 5,768,252 A | | 6/1998 | Yokota |
| 5,808,974 A | | 9/1998 | Jamail |
| 5,828,631 A | | 10/1998 | Shimabukuro |
| 5,831,966 A | | 11/1998 | Taira et al. |
| 5,838,666 A | | 11/1998 | Igarashi et al. |
| 5,940,242 A | * | 8/1999 | Lee .......................... 360/78.08 |

OTHER PUBLICATIONS

White, How Computers Work, 1997, Macmillan Publishing, Deluxe Edition, p. 28.*
Linux System Administrator's Guide 0.3, Andrew Anderson, Mar. 7, 1996, node1.html, node33.html,node35.html, node29.html.*

* cited by examiner

Primary Examiner—Glenn Gossage
Assistant Examiner—Brian R. Peugh
(74) Attorney, Agent, or Firm—Robert E. Bushnell, Esq.

(57) ABSTRACT

A hard disk on which table information varying depending on the model of a hard disk drive (HDD) is directly written includes: a hard disk assembly (HDA) having a hard disk for storing table information varying depending on the model of the HDD in a predetermined region of a data zone; and a main board having a RAM for reading and storing table information stored in the hard disk, a ROM for storing common table information irrelevant to the model of the HDD and programs for controlling the hard disk assembly and reading and writing of data, and a controller for reading and writing data according to the table information and programs stored in the RAM and ROM. Therefore, by storing table information varying depending on the model of an HDD in a disk and not in a ROM, a main ROM installed in the main PCB can be constructed with the same structure regardless of the model of an HDD, thereby simplifying the manufacturing process of the HDD.

20 Claims, 2 Drawing Sheets

HARD DISK ONTO WHICH TABLE INFORMATION DEPENDING ON MODEL IS WRITTEN, AND HARD DISK DRIVE ADOPTING SUCH A DISK

CLAIM OF PRIORITY

This application makes reference to, incorporates the same herein, and claims all benefits accruing under 35 U.S.C. §119 from an application for HARD DISK ONTO WHICH TABLE INFORMATION DEPENDING ON MODEL IS WRITTEN, AND HARD DISK DRIVE ADOPTING SUCH A DISK earlier filed in the Korean Industrial Property Office on the Dec. 31, 1997 and there duly assigned Serial No. 82026/1997.

BACKGROUND OF THE INVENTION

1. Field of the Invention

The present invention relates to the structure of a hard disk drive (HDD), and more particularly, to an HDD for directly writing table information in the data zone of each hard disk within the hard disk drive, which varies according to the model of the HDD, and thus controlling the hard disk according to the table information.

2. Description of the Related Art

A HDD has been widely used as an auxiliary memory device to write information on a magnetic recording medium and to read the information therefrom. The HDD, including an electronic device and a mechanical device, can read and write data by converting a digital electronic pulse, which varies momentarily, into a permanent magnetic field. Information is written while a head acting as an electromagnet reacts with a platter (or disk) having a magnetizing property. On the contrary, when reading the recorded information, the magnetized information is converted into an electrical signal.

In general, an HDD includes a magnetic head for reading/writing data, a recording medium (platter or disk) in which data is written and stored, a driving unit for driving the recording medium and the magnetic head, an electronic circuit for driving and controlling the driving unit, and an interface for connecting the HDD to a computer. The HDD is roughly divided into a hard disk assembly (HDA) including the disk and the magnetic head and a main printed circuit board (PCB) for controlling the reading and writing of data.

Different models of the hard disk can be manufactured, having various recording densities according to the type or number of heads, and the type of media, even if the same main PCB is used. Here, a main ROM used in the main PCB is selected depending on the model of the hard disk. However, the structure of the firmware used in each hard disk is the same, and only table information stored in each ROM is different. Thus, it is inconvenient to manufacture different ROMs according to the model of the HDD, and management of ROM codes is also difficult.

The following patents each disclose features in common with the present invention: U.S. Pat. No. 5,808,974 to Jamail, entitled Method Of Masking Data On A Storage Medium Using A Directory, U.S. Pat. No. 5,687,160 to Aotake et al., entitled Optical Recording Medium With Lists Having Playback Control Information, U.S. Pat. No. 5,708,650 to Nakashima et al., entitled Multiple Format Interchangeable Optical Recording Medium And Method Of Controlling Same, U.S. Pat. No. 5,617,385 to Lee et al., entitled Compact Disk And High-Speed Search Method Thereof And Recording Method Appropriate Therefor, U.S. Pat. No. 5,828,631 to Shimabukuro, entitled Apparatus For Reproducing Information From A Recording Medium Using Table Of Contents Information Stored On The Recording Medium, U.S. Pat. No. 5,838,666 to Igarashi et al., entitled Recording Medium Management Method Where Recording Is Carried Out By Data Recording Units In Accordance With Management Tables, U.S. Pat. No. 5,761,189 to Yamamuro, entitled Apparatus For Manufacturing A Maser Disk, Optical Disk Forming Apparatus, And Optical Disk Forming Method, U.S. Pat. No. 5,831,966 to Taira et al., entitled Recording Layer Identifying Data In A Multi-Layer Recording Medium, U.S. Pat. No. 5,754,521 to Yokota, entitled Recording Medium Having A First Management Area For Managing A First Attribute And A Second Management Area For Managing A Second Attribute Of A Program Recorded In A Recording Area, U.S. Pat. No. 5,768,252 to Yokota, entitled Method And Apparatus For Reproducing A Recording Medium Having A First Management Area For Managing A First Attribute And A Second Management Area For Managing A Second Attribute Of A Program Recorded In A Recording Area, and U.S. Pat. No. 5,721,724 to Taira et al., entitled Optical Disc Containing Data Stored And Linked Together In A Hierarchical, File Structure.

SUMMARY OF THE INVENTION

To solve the above problems, it is an objective of the present invention to provide a hard disk for a hard disk drive (HDD), to which table information according to the model of the HDD is directly written.

It is another objective of the present invention to provide an HDD for driving hard disks to which table information according to the model of the HDD is directly written.

Accordingly, to achieve the above first objective, there is provided a hard disk included in a hard disk assembly (HDA) of an HDD, with the hard disk having a data zone for storing magnetized data, wherein table information varying depending on the model of the HDD is stored in a predetermined region of the data zone.

To achieve the second objective, there is provided an HDD comprising: a hard disk assembly (HDA) having a hard disk for storing table information varying depending on the model of the HDD in a predetermined region of a data zone; and a main board having a RAM for reading and storing table information stored in the hard disk, a ROM for storing common table information irrelevant to the model of the HDD and programs for controlling the hard disk assembly and reading and writing of data, and a controller for reading and writing data according to the table information and programs stored in the RAM and ROM.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DESCRIPTION OF THE PREFERRED EMBODIMENTS

Figure 1:
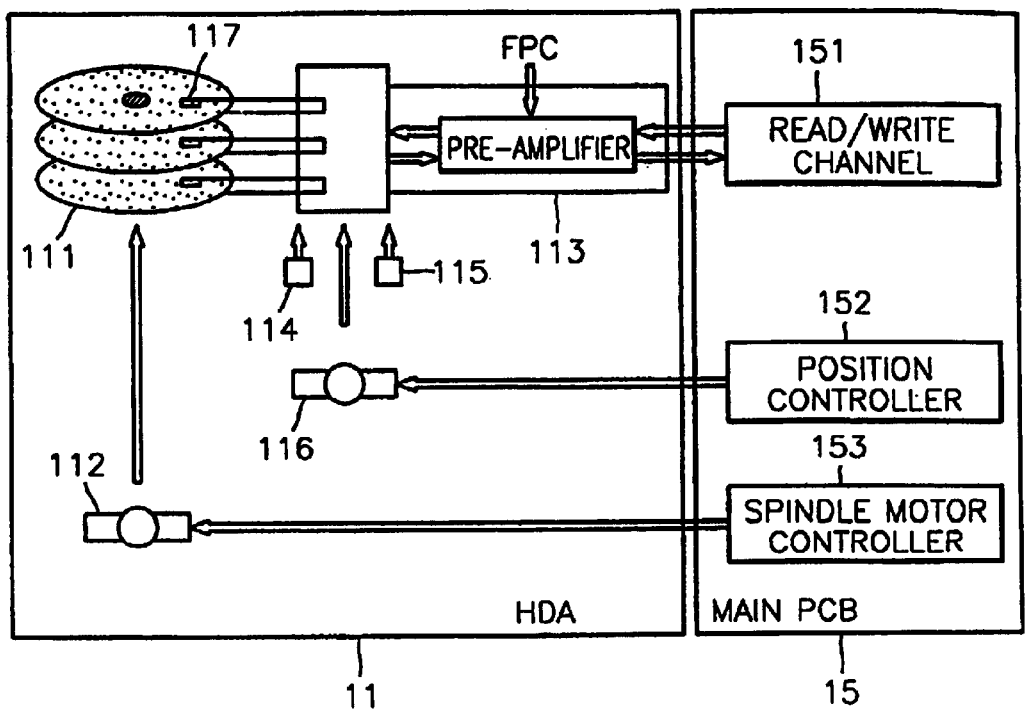
FIG. 1 is a block diagram showing the structure of a hard disk drive (HDD)

As shown in FIG. 1, which shows the structure of a hard disk drive (HDD), the HDD is roughly divided into a hard disk assembly (HDA) 11 and a main printed circuit board (PCB) 15 for controlling the HDA.

The HDA 11 includes a plurality of disks 111 for storing data, a plurality of heads 117 for writing data from a read/write channel onto the disks 111 and reading the data from the disks 111, a pre-amplifier 113 for amplifying a signal detected by the heads 117, a spindle motor 112 for rotating the disks 111 at a constant speed, a voice coil motor (VCM, not shown) for moving an actuator 116 into a predetermined portion of each disk, and crash stops 114, 115 for buffering the impact of the actuator 116 when the head 117 moves to a parking zone or slides out of a data zone during a search. All of the above elements of the HDA 11 are assembled within a closed metal box.

The main PCB 15 includes a read/write channel 151 for modulating and converting analog data read by the head 117 into a digital signal readable by a host and for receiving user data from the host to write the data on the disks 111 via the pre-amplifier 113, a position controller 152 for performing calculation and control required to move the actuator 116 into a predetermined position of the disk, and a spindle motor controller 153 for controlling the spindle motor 112 to a constant rotation speed. Programs required for such controls and information are stored in a main ROM (not shown) of the main PCB 15.

Figure 2:
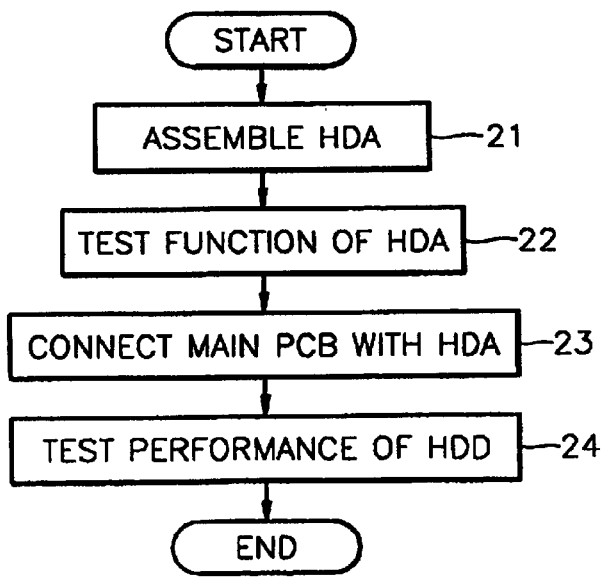
FIG. 2 is a flowchart illustrating a method for manufacturing an HDD according to the present invention.

FIG. 2 is a flowchart illustrating a method for manufacturing an HDD according to the present invention.

The HDA having the above structure is assembled (step 21), and the function of the HDA is tested (step 22). In step 22, the servo pattern of each hard disk is checked, and table information according to the model of the HDD is written in a predetermined area of each hard disk. Next, the main PCB is connected to the HDA (step 23). Also, the main ROM of the main PCB stores only common table information irrelevant to the model of the HDD. A performance test on the completed HDD, such as burn-in test, is performed (step 24).

Figure 3:
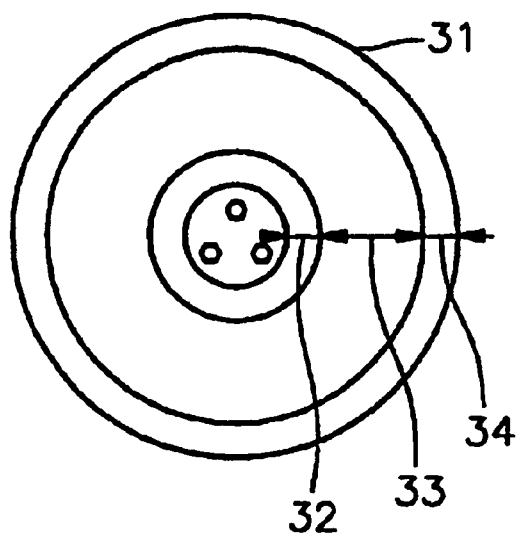
FIG. 3 shows the structure of a hard disk used in the HDD according to the present invention.

FIG. 3 shows the structure of a hard disk used in the HDD according to the present invention. The hard disk is an information storing medium for storing information of magnetic stray flux provided from the head. In the hard disk, a magnetic material, capable of permanently sustaining magnetization, is deposited on a substrate, and magnetization direction of the electromagnet changes according to the magnetic field applied to the substrate from the outside. The area of the hard disk 31 is classified according to its function as follows: an inner guard band (IGB) 32 which is nearest to the center of the disk, a data zone 33 and an outer guard band 34 which is farthest from the center of the disk.

A magnetic disk for the HDD is classified according to the coating method of the magnetic material and its size. That is, according to the coating method, the magnetic disk is classified as one of an oxide coated disk, a thin film plated disk and a thin film sputtered disk. Also, the magnetic disk is classified as one of 8-inch, 5.25-inch, 3.5-inch, 3.0-inch, 2.5-inch and 1.8-inch disks according to the size.

When writing data onto a rotating disk, the sector length in the inner portion of the disk is relatively short while being relatively long in the outer portion of the disk if a signal to be written has a constant frequency. Here, the capacity of the drive can be increased when the sector lengths at the outer and inner portions are the same, and such data writing method is called "multi-zone recording".

Also, the disk has a great number of concentric tracks and data is written to those tracks. Because a real HDD adopts a plurality of disks overlapped, there are many tracks having the same radius. A bundle of such tracks is called a cylinder. The track is divided in units of sectors and each sector includes identification (ID) information identifying one sector from another, data and an error correction code.

In the hard disk of the present invention, table information according to the model of the HDD is stored in a predetermined portion of the data zone 33. Here, the table information refers to information varying depending on the model of the HDD, such as information relating to the type and number of heads, a sector time table, zone-map information, recording density or read/write channel information. The data zone of the hard disk is divided into a user's area capable of being used by a user and a manufacturer's area capable of being used by a manufacturer of a driver. Here, the table information is written in the manufacturer's area. Also, when a plurality of disks are adopted, the table information is written in the same cylinder area.

Figure 4:
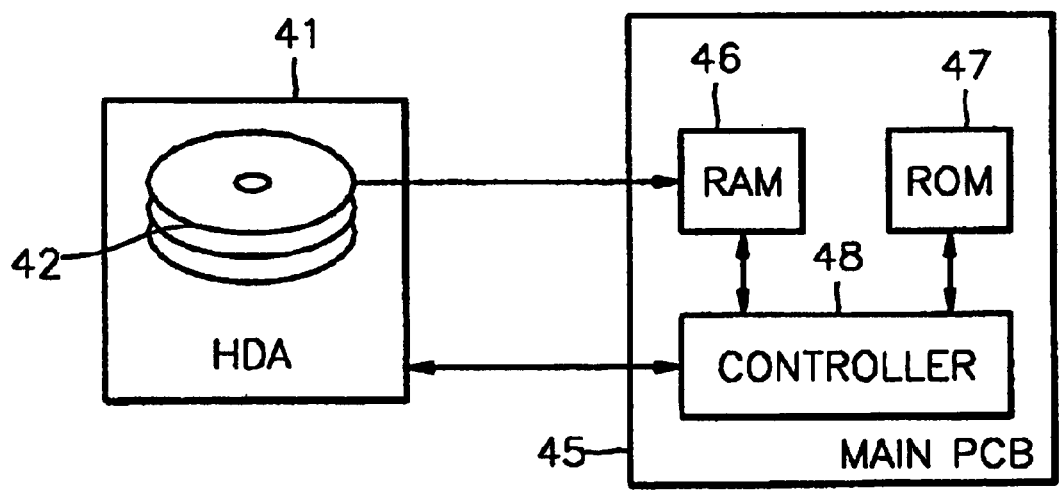
FIG. 4 is a schematic diagram showing an HDD according to the present invention.

FIG. 4 is a schematic diagram showing an HDD according to the present invention. The HDD roughly includes an HDA 41 having a plurality of disks 42 and a main PCB 45 for controlling the drive.

As described with reference to FIG. 3, table information varying depending on the model of an HDD is written to a predetermined region of the data zone 33 of the hard disk 42. Here, the table information may be information relating to the type and number of heads, a sector time table or zone-map information.

The main PCB 45 includes a RAM 46 for reading the table information stored in the hard disk 42 and storing the read table information therein, a ROM 47 for storing common table information irrelevant to the model of the HDD and programs for controlling the HDA 41 and read/write of data, a controller 48 for controlling read/write of data according to the table information of the RAM 46 and the table information/programs stored in the ROM 47. The controller 48 controls read/write of data, and controls the position of a head and rotation of a spindle motor, as described above. The table information read from the ROM 47 and the RAM 46 are required for use such functions of the controller 48.

As described above, in the HDD according to the present invention, table information varying depending on the model of an HDD is stored in a disk and not in a ROM, the main ROM installed in the main PCB can be constructed with the same structure regardless of the model of an HDD, thereby simplifying the manufacturing process of the HDD.

It should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. A hard disk drive, comprising:
   an assembly of at least one hard disk having a data zone for storing magnetized data;
   specific table information corresponding to a type and number of heads for said assembly varying in dependence upon the model of the hard disk drive, stored in a predetermined region of the data zone; and
   a read only memory contained within said hard disk drive, comprising:
   common table information functionally applicable to both said hard disk drive and to a plurality of different hard disk drives exhibiting various capacities for data storage; and programs operationally controlling said assembly.

2. The hard disk of claim 1, with said hard disk assembly comprising a plurality of hard disks, with said table information being written into the same cylinder area of each of said plurality of hard disks.

3. The hard disk of claim 1, further comprised of:

said table information varying in dependence upon said model, specifying a type and number of heads within said assembly incorporating said hard disk and distinguishing said assembly from a plurality of characteristically different hard disk assemblies; and said table information being written into the same cylinder area of each of said plurality of hard disks.

4. A hard disk drive, comprising:

an assembly of at least one hard disk having a data zone for storing magnetized data;

table information varying in dependence upon the model of the hard disk drive being stored in a predetermined region of the data zone, the table information comprising at least one of a sector time table, zone-map information, recording density, or read/write channel information;

a read only memory contained within said hard disk drive, readily interchangeable among and operationally functionable with a plurality of different hard disk drives exhibiting various capacities for data storage, said read only memory comprising:

common table information functionally applicable to both said hard disk drive and to a plurality of different hard disk drives exhibiting various capacities for data storage; and programs operationally controlling said assembly.

5. The hard disk of claim 2, with said hard disk assembly comprising a plurality of hard disks, with said table information being written into the same cylinder area of each of said plurality of hard disks.

6. The hard disk of claim 2, further comprised of:

said table information varying in dependence upon said model, specifying a type and number of heads within said assembly incorporating said hard disk and distinguishing said assembly from a plurality of characteristically different hard disk assemblies; and said table information being written into the same cylinder area of each of said plurality of hard disks.

7. A hard disk drive, comprising:

a hard disk assembly having a hard disk for storing specific table information varying depending on the model of the hard disk drive in a predetermined region of a data zone; and a main board having a random access memory for storing table information stored in the hard disk, a read-only memory for storing common table information irrelevant to the model of the hard disk drive and programs for controlling the hard disk assembly and reading and writing of data, and a controller for reading and writing data according to the common table information and programs stored in the read-only memory.

8. The hard disk drive of claim 7, the table information comprising at least one of information relating to the type and number of heads, a sector time table, zone-map information, recording density or read/write channel information.

9. The hard disk drive of claim 7, further comprised of said main board being interchangeable with any of a plurality of characteristically different hard disk assemblies including said hard disk assembly, structurally combined with said hard disk assembly within said hard disk drive and operationally mated with said hard disk assembly as a discrete hard disk drive.

10. The hard disk drive of claim 7, further comprised of:

said table information varying in dependence upon said model, specifying a type and number of heads within said hard disk assembly and distinguishing said hard disk assembly from a plurality of characteristically different hard disk assemblies; and said main board being interchangeable with any of said plurality of characteristically different hard disk assemblies including said hard disk assembly, structurally combined with said hard disk assembly within said hard disk drive and operationally mated with said hard disk assembly as a discrete hard disk drive.

11. A hard disk drive, comprising:

a hard disk assembly having a hard disk exhibiting a major surface comprised of a radially outer guard band circumferentially surrounding a data zone for storing magnetized data, and a radially inner guard band circumferentially surrounded by said data zone, said data zone being divided into a user's area and a manufacturer's area storing within a predetermined area table information that corresponds to a model of said hard disk drive, with said table information varying in dependence upon said model, specifying a type and number of heads within said hard disk assembly and distinguishing said hard disk assembly from a plurality of characteristically different hard disk assemblies; and a main board interchangeable with any of said plurality of characteristically different hard disk assemblies, structurally combined with said hard disk assembly within said hard disk drive and operationally mated with said hard disk assembly as a discrete hard disk drive, said main board comprised of:

a random access memory for reading and storing said table information read from said hard disk;

a read-only memory for storing common information irrelevant to the model of the hard disk drive but common to said plurality of characteristically different hard disk drives, and storing programs for controlling the hard disk drive; and a controller for reading and writing data in accordance with said table information and in accordance with programs stored in the random access memory and in said read only memory.

12. The hard disk drive of claim 11, with said table information comprising at least one of information relating to the type and number of heads within said hard disk assembly, a sector time table, zone-map information, recording density or read/write channel information.

13. The hard disk drive of claim 12, with said hard disk assembly comprising a plurality of hard disks, with said table information being written into the same cylinder area of each of said plurality of hard disks.

14. The hard disk drive of claim 11, with said hard disk assembly comprising a plurality of hard disks, with said table information being written into the same cylinder area of each of said plurality of hard disks.

15. A process of using a hard disk drive, comprising:

assembling into an assembly at least one hard disk exhibiting a major surface comprised of a radially outer guard band circumferentially surrounding a data zone, and a radially inner guard band circumferentially surrounded by said data zone for storing magnetized data, said data zone being divided into a user's area and a manufacturer's area;

storing within a predetermined area of said manufacturer's area table information that corresponds to a model of said hard disk drive, with said table information varying in dependence upon said model, specifying a type and number of heads within said hard disk assembly and distinguishing said hard disk assembly from a plurality of characteristically different hard disk assemblies;

forming a discrete hard disk drive by structurally combining and operationally mating to said hard disk assembly a main circuit board that is interchangeable with any of said plurality of characteristically different hard disk assemblies, said main board comprised of:
 a random access memory for reading and storing said table information read from said hard disk;
 a read-only memory for storing programs for controlling the hard disk drive; and
 a controller for reading and writing data in accordance with said table information and in accordance with programs stored in the random access memory and in said read only memory; and storing within said read only memory common information irrelevant to the model of the hard disk drive but common to said plurality of characteristically different hard disk drives.

16. The process of claim 15, further comprised of writing said table information into the same cylinder area of each of said plurality of hard disks within said hard disk assembly.

17. The process of claim 15, with said table information comprising at least one of information relating to the type and number of heads within said hard disk assembly, a sector time table, zone-map information, recording density or read/write channel information.

18. The process of claim 17, further comprised of writing said table information into the same cylinder area of each of said plurality of hard disks within said hard disk assembly.

19. A hard disk drive, comprised of:
 an assembly of at least one hard disk forming one model from among a plurality of characteristically different models of hard disk drive assemblies, with one of said at least one hard disk having a data zone for storing magnetized data;
 specific table information corresponding to a type and number of heads for said assembly varying in dependence upon said model of the hard disk drive, stored in a predetermined region of the data zone, said specific table information specifying a type and number of heads within said assembly incorporating said at least one hard disk and distinguishing said assembly from said plurality of characteristically different hard disk drive assemblies;
 a read only memory mounted within said hard disk drive, comprising:
  common table information functionally applicable to both said hard disk drive and to said plurality of different hard disk drive assemblies exhibiting various capacities for data storage; and
  programs operationally controlling said hard disk drive and the plurality of characteristically different hard disk drive assemblies.

20. A hard disk drive, comprised of:
 an assembly of at least one hard disk forming one model from among a plurality of characteristically different models of hard disk drive assemblies, with said hard disk having a data zone
 specific table information corresponding to a type and number of heads for said assembly conforming to said model of the hard disk drive, stored in a predetermined region of the data zone, said table information specifying a type and number of heads within said assembly incorporating said hard disk and distinguishing said assembly from said plurality of characteristically different hard disk drive assemblies;
 a read only memory mounted within said hard disk drive, said memory being readily interchangeable among and operationally functionable with said plurality of characteristically different models of hard disk drives, said read only memory comprising:
  common table information functionally applicable to both said hard disk drive and to said plurality of characteristically different hard disk drives; and
  programs operationally controlling said hard disk drive and the plurality of characteristically different hard disk drives.

* * * * *